United States Patent
Glauber et al.

[11] Patent Number: 6,095,112
[45] Date of Patent: Aug. 1, 2000

[54] RECIPROCATING PISTON ENGINE

[75] Inventors: Robert Glauber, Friedberg; Kai Rieck, Augsburg; Peter Eilts, Stadtbergen, all of Germany

[73] Assignee: MAN B&W Disel Aktiengesellschaft, Augsburg, Germany

[21] Appl. No.: 09/156,874

[22] Filed: Sep. 18, 1998

[30] Foreign Application Priority Data

Sep. 20, 1997 [DE] Germany .......................... 197 41 566

[51] Int. Cl.⁷ .................................................. F02M 1/00
[52] U.S. Cl. ............................ 123/275; 123/256; 123/526
[58] Field of Search .................................. 123/275, 277, 123/526, 256, 284

[56] References Cited

U.S. PATENT DOCUMENTS

| | | | |
|---|---|---|---|
| 4,112,878 | 9/1978 | Heitland et al. | 123/275 |
| 4,119,066 | 10/1978 | Happel | 123/275 |
| 5,050,550 | 9/1991 | Gao | 123/275 |
| 5,070,833 | 12/1991 | Matsuoka | 123/275 |
| 5,887,566 | 3/1999 | Glauber et al. | 123/275 |

FOREIGN PATENT DOCUMENTS 0 377 265  7/1990  European Pat. Off. .

OTHER PUBLICATIONS

K Saito et al., "Development of the Hot Engine With Selective Use of City Gas or Diesel Oil for the City Type Co–Generation System", Paper D29, CIMAC 1995, pp. 1–20.

*Primary Examiner*—John Kwon
*Attorney, Agent, or Firm*—Cohen, Pontani, Lieberman & Pavane

[57] ABSTRACT

A reciprocating piston engine which is selectively operable in either a gas operation mode with a gaseous fuel or a diesel operation mode with a liquid fuel includes a main combustion chamber which has an inlet for receiving gas and/or air, an injection device and an outlet. At least one precombustion chamber is connected to the main combustion chamber by at least one precombustion chamber output that opens into said main combustion chamber. Each precombustion chamber has an applied-ignition device for igniting the contents of the precombustion chamber during gas operation. An optimization of exhaust gas values, particularly of the $NO_x$ concentrations, is attained by the applied-ignition device and a separate gas line for supplying the precombustion chamber with gas, thereby allowing a leaner fuel mixture to be used in the main combustion chamber.

7 Claims, 1 Drawing Sheet

RECIPROCATING PISTON ENGINE

BACKGROUND OF THE INVENTION

1. Field of the Invention

The invention relates to a reciprocating piston engine that optionally operates in a diesel operating mode with a liquid fuel or a gas operating mode using a gaseous fuel. The inventive engine has at least one main combustion chamber. The main combustion has an inlet for gas and/or air, an injection device and an outlet. At least one precombustion chamber is connected to each main combustion chamber via an output opening in said main combustion chamber and each precombustion chamber has a device to ignite its contents during gas operation.

2. Description of the Related Art

In a known generic reciprocating piston engine, the main combustion chamber may optionally be filled with either a gas-air mixture via a feed line in gas operation or with liquid fuel via an injection device and air via a feed line in diesel operation. In gas operation, an ignition oil is injected into the precombustion chamber, which opens in the main combustion chamber. When the contents of the main combustion chamber, and thus the contents of the precombustion chamber connected thereto, are compressed, the ignition oil is ignited upon an upward piston stroke. The ignition oil thereby emerges into the main combustion chamber and ignites the gas located therein. The gas in the main combustion chamber will not self-ignite without the ignition oil being ignited in a precombustion chamber, and will ignite only poorly by means of applied ignition in the main combustion space. However, when the gas is ignited with ignition oil, unsatisfactory-and, in certain locations, impermissible-concentrations of $NO_x$ are created due to the ignition oil. Furthermore, when gas operation is planned, ignition oil must be kept available for ignition at all times. Moreover, the spark plug in the precombustion chamber must also operate during diesel operation, so that it does not clog.

SUMMARY OF THE INVENTION

It is an object of the present invention to provide a simple and economical reciprocating piston engine that is operable in a diesel operating mode with liquid fuel and a gas operating mode with a gaseous fuel while reducing the $NO_x$ concentration in the exhaust gas.

The object of the present invention is attained by using a device for ignition during gas operation that is an electric applied-ignition device and by filling the precombustion chamber with gas via a separate auxiliary gas line.

In the arrangement according to the invention, the gas-air mixture introduced into the main combustion chamber upon the intake stroke also enters the precombustion chamber. An additional supply of gas is added to the mixture in the precombustion chamber via an auxiliary gas line for mixture enrichment. The contents of the precombustion chamber are ignited by the electric applied-ignition device and the ignited gas-air mixture enters the gas-air mixture present in the main combustion chamber, thereby igniting the gas in the main combustion chamber. Accordingly, no ignition oil is necessary, thereby eliminating the need to keep a supply of ignition oil on hand for use with the engine during gas operation. Further, no separate injection device for the ignition oil is needed. The $NO_x$ values resulting from the inventive arrangement are better than in the prior art arrangements ignited with ignition oil.

The principle of applied ignition for diesel/gas engines in gas operation was proposed at the 21st International Congress for Combustion Engines of the CIMAC (Conseil international des machines a combustion). However, the publication that issued on the occasion of this congress describes an applied ignition of the gas-air mixture in the main combustion chamber that does not allow the ignition of leaner mixtures with air-fuel ratios greater than 1.7. Accordingly, the combustion engine arrangement described in this prior art publication cannot achieve the favorable exhaust gas values, particularly the $NO_x$ values, that are attained in the according to the invention using air-fuel ratios greater than 1.7. The engine described in the aforementioned publication operates with a stoichiometric air-fuel ratio, while the diesel/gas engine according to the present invention operates in the lean-burn process. The engine described in the prior art publication requires a 3-way catalytic converter to attain acceptable exhaust gas values.

In a preferred embodiment, each cylinder comprises several precombustion chamber outputs that open into one main combustion chamber. As a result, the gas-air mixture in the main combustion chamber is ignited in several regions, and thus very evenly, so that the exhaust gas values are optimized.

Advantageously, several precombustion chambers are thereby provided. In this arrangement, the gas in the precombustion chambers is independently activated by a motor control device at the appropriate timepoint. In a similarly economical embodiment, one precombustion chamber has several precombustion chamber outputs, which open into the main combustion chamber.

Preferably, the precombustion chamber outputs are distributed roughly evenly, in terms of area, over the cross-section of the main combustion chamber. This permits a relatively even distribution of the pre-ignited gas in the main combustion chamber, and thus a relatively even ignition in the main combustion chamber, as a result of which the exhaust gas values are further improved.

The air-fuel ratio in the main combustion chamber is preferably greater than or equal to approximately 1.7, because this permits "lean burn" operation with a very lean mixture and results in very low nitrogen oxide concentrations in the exhaust gas. To ensure reliable ignition of the precombustion chamber contents, the air-gas mixture ratio in the precombustion chambers is advantageously less than approximately 1.7.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
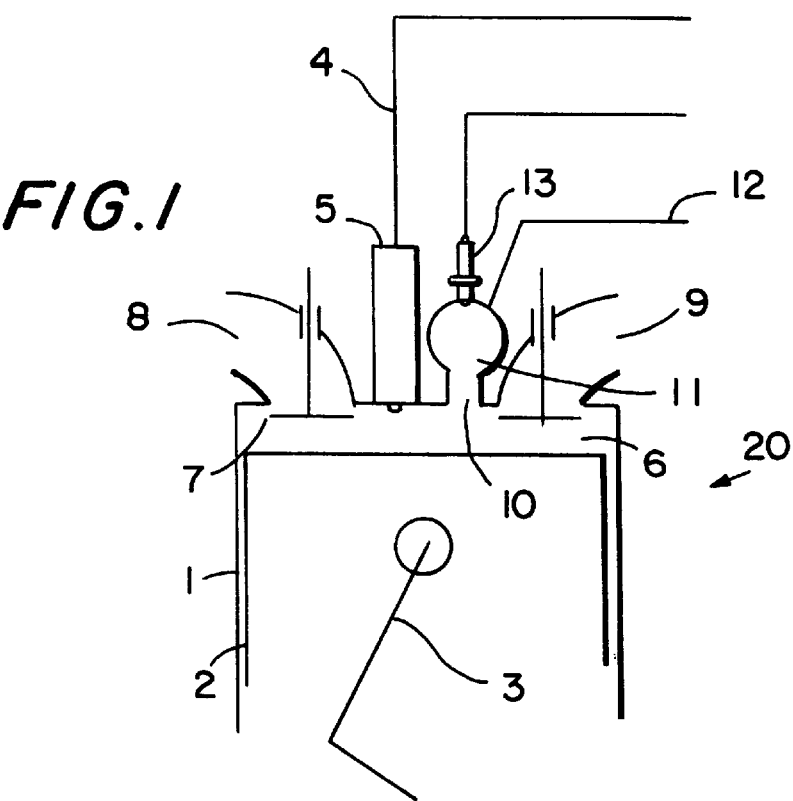
FIG. 1 is a schematic view of an embodiment of a reciprocating piston engine according to the present invention with a precombustion chamber having gas feed line and an electric ignition device.

Referring initially to FIG. 1, a cylinder 20 of a reciprocating piston engine according to the invention is schematically shown including a piston 2 which is guided by a piston connecting rod 3 and runs in a cylinder liner 1. Although only one cylinder 20 is shown, the reciprocating piston engine may comprise more than one cylinder. The reciprocating engine is selectively operable in either a gas mode using a gaseous fuel or a diesel mode using a liquid fuel. The liquid fuel is preferably diesel fuel.

During diesel operation of the cylinder, liquid fuel is supplied via a diesel feed line 4 to an injection device 5 which injects the diesel fuel into a main combustion chamber 6. Air is supplied during diesel operation via an inlet 8 with a gas valve 7. When the piston 2 moves upward, the diesel-air mixture is ignited by self-ignition and burns. The exhaust gases are forced from the main combustion chamber 6 through an outlet 9 which is closable by a valve.

In gas operation, the gas valve 7 at the inlet 8 is open for gas and/or air, and a mixture of air and the gas to be burned is introduced into the main combustion chamber 6 during the intake stroke. This gas-air mixture is distributed in the main combustion chamber 6 as well as in the precombustion chamber 11, which is connected to the main combustion chamber 6 via the precombustion chamber output 10. A gas line 12 opens in the precombustion chamber 11. Through the gas line 12, the gas-air mixture in the precombustion chamber 11 is enriched with additional gas. The gas supplied to the precombustion chamber 11 via the gas line 12 may be, for example, pure gas or a gas-air mixture with a lower proportion of air than that in the gas-air mixture introduced via the inlet 8 for gas and/or air. The relatively rich contents of the precombustion chamber 11 that result from this enrichment with extra gas is ignited by an applied-ignition device 13 without ignition oil. For this purpose, the applied ignition device 13 in the form of a spark plug is provided in the precombustion chamber 11. This applied ignition device 13 is controlled from a motor control device permitting a precise selection of the ignition timepoint.

The rich mixture in the precombustion chamber 11 is ignited by the applied ignition device 13 and then emerges from the precombustion chamber 11 into the main combustion chamber 6 igniting the gas-air mixture located therein. According to the invention, the gas-air mixture located in the main combustion chamber 6 is ignited by the rich gas that was ignited in the precombustion chamber 11 even when the gas-air mixture in the main combustion chamber 6 is relatively lean. Thus, the air-fuel ratio in the main combustion chamber 6 can be greater than 1.7 and, according to tests, even greater than 2. The combustion of the lean mixture results in favorable exhaust gas values, especially very low $NO_x$ values, in the exhaust gas of the diesel/gas engine.

To ensure reliable ignition of the gas in the precombustion chamber 11, the contents of the precombustion chamber 11 are advantageously enriched via the gas line 12 to an air-fuel ratio of less than 1.7.

The combustion of the gas-air mixture in the main combustion chamber 6 may be improved by using several precombustion chamber outputs 10. A precombustion chamber with several outputs 10 that open into the main combustion chamber 6 may be used for this purpose. The several outputs 10 are optimally distributed roughly evenly over the cross-sectional surface of the main combustion chamber 6.

Figure 2:
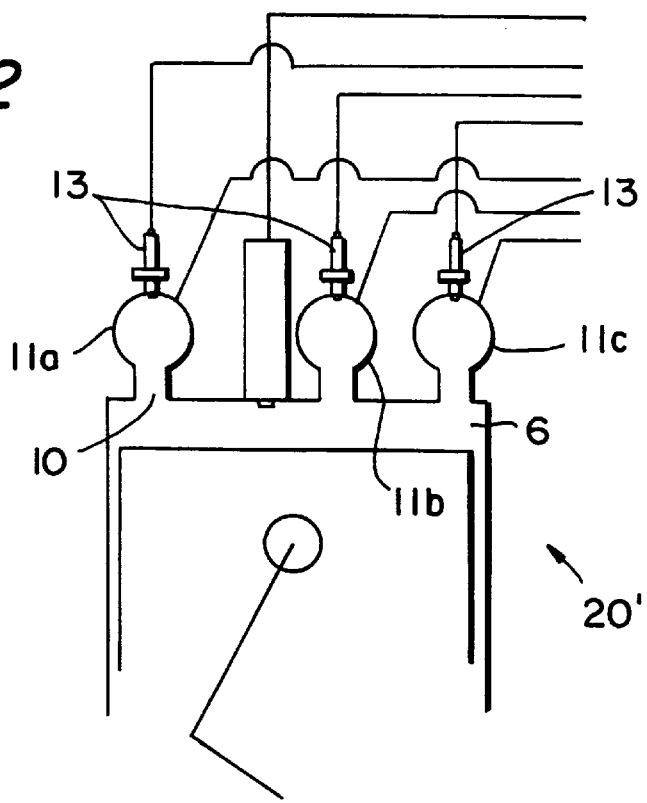
FIG. 2 is a schematic view of another embodiment of a reciprocating piston engine according to the present invention with several precombustion chambers associated with a main combustion chamber.

Referring now to FIG. 2, a cylinder 20' having several precombustion chambers 11a, 11b, 11c connected to the main combustion chamber 6 is shown. In the example shown, each of the precombustion chambers 11a, 11b, 11c has only one output 10. However, each precombustion chamber 11a, 11b, 11c, may have more than one output 10. The use of multiple precombustion chambers 11a, 11b, 11c permits the individual activation of the ignition point in each precombustion chamber 11.

The invention is not limited by the embodiments described above which are presented as examples only but can be modified in various ways within the scope of protection defined by the appended patent claims.

We claim:

1. A reciprocating piston engine selectively operable in one of a gas operation mode using a gaseous fuel and a diesel operation mode using a liquid fuel, said engine comprising:

a main combustion chamber having an inlet, an injection device and an outlet, said inlet and said injection device being operatively connected for receiving one of a first fuel mixture including the liquid fuel during the diesel operation mode and a second fuel mixture including the gaseous fuel during the gas operation mode;

a precombustion chamber having a precombustion chamber output connecting said precombustion chamber to said main combustion chamber;

an applied-ignition device operatively mounted in said precombustion chamber for igniting contents of said precombustion chamber during the gas operation mode at a selectable timepoint; and a gas line for supplying an additional amount of said gaseous fuel to said precombustion chamber during said gas operation mode for enriching the content of said precombustion chamber relative to said main combustion chamber, wherein an air-fuel ratio in said main combustion chamber is equal to or greater than 1.7 and an air-fuel ration in said precombustion chamber is less than 1.7 during said gas operation mode.

2. The reciprocating piston engine of claim 1, wherein said precombustion chamber comprises a plurality of precombustion chamber outputs opening into said main combustion chamber.

3. The reciprocating piston engine of claim 2, wherein said plural precombustion chamber outputs are distributed roughly evenly over a cross-section of said main combustion chamber.

4. The reciprocating piston engine of claim 1, wherein said precombustion chamber comprises a plurality of precombustion chambers.

5. The reciprocating piston engine of claim 4, wherein each said plural precombustion chambers comprises a plurality of precombustion chamber outputs opening into said main combustion chamber.

6. The reciprocating piston engine of claim 4, wherein said precombustion chamber outputs of said plural precombustion chambers are distributed roughly evenly over a cross-section of said main combustion chamber.

7. The reciprocating piston engine of claim 1, wherein said applied-ignition device comprises an electric applied-ignition device.

* * * * *